3,766,108
POLYVINYL ACETATE BALLOON MAKING SYSTEM

Shieu Shin Liwa, Taichung Hsien, Taiwan, assignor to Mutron Industries, Ltd., Kowloon, Hong Kong
No Drawing. Continuation of abandoned application Ser. No. 45,921, June 12, 1970. This application Apr. 13, 1972, Ser. No. 243,891
Int. Cl. A63h 3/06; C08b 25/02
U.S. Cl. 260—23 R                                              10 Claims

ABSTRACT OF THE DISCLOSURE

A system for producing toy balloons or bubbles and a process for obtaining the balloon making product. The system utilizes polyvinyl acetate as the elastomer together with an opacifying agent, a texturing agent and a solvent for the polyvinyl acetate. Depending on the tint desired, a coloring agent may also be added. The system is produced by mixing and heating the opacifying texturing agents, adding the solvent together with the desired colorant under continued application of heat and thereafter adding the polyvinyl acetate to the prepared mixture with additional mixing until a thoroughly homogeneous product is obtained.

CROSS REFERENCE TO RELATED APPLICATIONS

This application is a continuation of U.S. Ser. No. 45,921, filed June 12, 1970, now abandoned.

BACKGROUND OF THE INVENTION

The present invention relates to a compound and a method for producing the compound for use in making toy balloons and bubbles.

The use of polyvinyl acetate to make toy balloons has heretofore been disclosed (see, for example, U.S. Pat. 2,438,854). In such prior art systems, coloring dyes and polyvinyl acetate have been dissolved in polyvinyl acetate solvents to product a plastic, balloon making compound. The material produced by this process is then packaged in a dispensing tube for later use.

In use a small amount of the material was dispensed from the tube and placed in airtight relationship on the end of a blow pipe and by blowing on the opposite end of the tube, the material was caused to be inflated. The resultant bubble or balloon was characterized by several deficiencies including high transparency and low tensile strength of the balloon thus produced. As a result the balloons had an unsatisfactory quality and were flimsy and relatively colorless.

Another serious drawback to prior art polyvinyl acetate balloons was its sticky surface texture. Thus balloons produced from such a material frequently stuck to fingers, clothing, etc. during inflation. This made balloon blowing both difficult and unpleasant. The problem of inflating was further intensified by the fact that the solvent in the balloon making compound sometimes evaporated rapidly causing the material on the end of the blow pipe to harden quickly, thereby making inflation difficult or impossible.

SUMMARY OF THE INVENTION

In contrast to the prior art systems, the present invention provides a plastic compound which results in a balloon making system capable of producing colorful, shiny, non-tacky, durable balloons. The invention provides a balloon making compound including a polymer comprising a substantial amount of vinyl acetate, an opacifying agent in an amount of 1 to 20% by weight of the compound, a texturing agent in an amount of 1 to 20% by weight of the compound, a coloring agent in an amount of from 1 to 10% by weight of the compound and a polyvinyl acetate solvent in an amount of from 10 to 25% by weight of the compound.

The invention also contemplates a method of producing a balloon making system comprising the steps of mixing a polyvinyl acetate opacifying agent with a polyvinyl acetate surface texturing agent, applying heat to said mixture, adding a polyvinyl acetate solvent to said mixture to produce a second mixture and thereafter adding the polyvinyl acetate to the preceding mixture to produce the balloon making compound.

In general, the improved balloon of the present invention is obtained by mixing suitable amounts of rosin, titanium dioxide and stearin, or a stearin fatty substance e.g., stearic acid and thereafter adding the polyvinyl acetate base. Titanium dioxide and rosin are readily miscible with the polyvinyl acetate base to form a homogeneous compound, one which has substantially enhanced coloring qualities in comparison to prior art systems and one which is further characterized by a high degree of opaqueness, eliminating the problems of transparency of prior art balloons. In addition, the resultant compound has a substantially improved elasticity, a characteristic which is of significant importance in producing a uniform, flexible balloon.

The stearin and stearin fatty substances added to the mixture impart a shining or glossy quality to the surface of the finished balloon and in addition have a significant effect on the texture of the balloon surface tending to reduce its stickiness or tackiness.

DESCRIPTION OF A SPECIFIC EMBODIMENT

The steps of producing the balloon making compound according to the present invention include as an initial step the mixing of a polyvinyl acetate opacifying agent and a polyvinyl acetate texturing agent in a suitable mixing receptacle. One or more specific compounds may be utilized in each of the functions of pacification and texturing and in a preferred embodiment both titanium dioxide and rosin powder are utilized for opacifying purposes. In order to obtain surface texturing of the resultant balloon according to a preferred embodiment, mineral oil; glycerin and stearin are provided and are mixed with the opacifying agents with the simultaneous application of heat to the mixture to cause it to liquify. The texturing agents also serve to modulate and improve the elasticity of the resultant balloon in comparison to prior art balloons. In a separate vessel is provided a polyvinyl acetate solvent such as acetone, ethanol or ethyl acetate to which is added the desired coloring agent, if any. The coloring agent is in the form of a conventional pigment or dye which is dispersible or soluble in the selected solvent.

Where the color of the balloon or bubble to be produced with the system of the present invention is white, the amount of titanium dioxide added during the first step of compound preparation is substantially increased over that necessary to accomplish the opacifying function in order to supply the desired white color to the end product. The colored solvent is then added to the liquefied mixture of opacifying and texturing agents with the application of heat being continued and is thoroughly mixed with those ingredients. As a final step approximately 70% by weight of the total compound of a polymer comprised substantially of vinyl acetate is added to the above combination of ingredients and is mixed thoroughly to obtain a homogeneous mixture.

In substitution for titanium dioxide, other materials such as starch and calcium carbonate can be utilized as an opaqueing and color vehicle agent. Likewise cumarone can be substituted for rosin as an elasticity modulating agent. Similarly, propylene glycol and stearin fatty substances are suitable substitutes for any of the texturing agents, viz. stearin, etc. Mineral oil can be replaced by vegetable oil. Finally, methyl acetate or butyl acetate may also be used in place of acetone, ethanol, etc., as a polyvinyl acetate solvent.

Specific examples for making compounds of various colors and the specific amounts of ingredients provided therein are as follows:

Example I

Step 1.—To provide a compound which is red in color the following ingredients are added to a mixing vessel with the application of heat to the vessel:

| Ingredients: | Weight, lbs. |
|---|---|
| Titanium dioxide | 4 |
| Rosin | 8 |
| Stearin | 3 |
| Glycerin | 3 |
| Mineral oil | 2 |

Step 2.—In a separate vessel there is prepared:

| | Lbs. |
|---|---|
| Red pigment, e.g. iron oxide | 7 |
| Acetone | 15 |

The coloring agent-solvent mixture is then added to the ingredients prepared in Step 1 and is thoroughly mixed therein.

Step 3.—To the mixture prepared in Steps 1 and 2, 70 pounds of polyvinyl acetate is added and the resultant mixture is stirred for two hours with the continued application of sufficient heat to maintain a liquid mass.

Example II

To provide a black compound, the process steps as outlined in Example I are repeated with the specific ingredients and amounts as follows:

| Ingredients: | Weight, lbs. |
|---|---|
| Step 1: | |
| Titanium dioxide | 4 |
| Rosin | 8 |
| Stearin | 3 |
| Glycerin | 3 |
| Mineral oil | 2 |
| Step 2: | |
| Black coloring agent, e.g. carbon black | 10 |
| Ethyl acetate | 30 |
| Step 3: Polyvinyl acetate | 70 |

Example III

To make a yellow compound, the following ingredients are utilized, again according to the same procedures as outlined in Example I:

| Ingredients: | Weight, lbs. |
|---|---|
| Step 1: | |
| Titanium dioxide | 4 |
| Rosin | 8 |
| Stearin | 3 |
| Glycerin | 3 |
| Spindle oil | 2 |
| Step 2: | |
| Yellow coloring agent, e.g. benzidine yellow | 8 |
| Ethanol | 15 |
| Step 3: Polyvinyl acetate | 70 |

Example IV

To make a blue compound:

| Ingredients: | Weight, lbs. |
|---|---|
| Step 1: | |
| Titanium dioxide | 5 |
| Rosin | 8 |
| Stearin | 3 |
| Glycerin | 3 |
| Mineral oil | 2 |
| Step 2: | |
| Blue coloring agent, e.g. cobalt blue | 5 |
| Butyl acetate | 15 |
| Step 3: Polyvinyl acetate | 70 |

Example V

To make a white compound:

| Ingredients: | Weight, lbs. |
|---|---|
| Step 1: | |
| Titanium dioxide | 20 |
| Rosin | 8 |
| Stearin | 3 |
| Glycerin | 3 |
| Mineral oil | 2 |
| Step 2: Ethyl acetate | 15 |
| Step 3: Polyvinyl acetate | 70 |

Example VI

To make still another red compound:

| Ingredients: | Percentage by weight |
|---|---|
| Step 1: | |
| Titanium dioxide | 81 |
| Rosin | 6.52 |
| Stearic acid | 2.46 |
| Glycerin | 1.61 |
| Mineral oil | 10.0 |
| Step 2: | |
| Red pigment or coloring agent, e.g. iron oxide | 5.67 |
| Acetone | 16.36 |
| Step 3: Polyvinyl acetate | 56.57 |

The balloon making compound produced according to any one of the preceding examples is then packaged in a dispenser such as a collapsible tube for later use by the balloon or bubble maker. To use the compound a small amount is squeezed from the tube and the dispensed portion is then placed around one end of the blow pipe so that it covers and is in an airtight relationship with this end of the pipe. By applying fluid pressure such as by blowing, the balloon making compound is caused to swell and inflate. When the balloon or bubble has reached a predetermined size (corresponding to the amount of balloon making compound being used) is is removed from the end of the blow pipe and pinched at the point of removal so as to prevent the escape of air through the inflation aperture.

To produce a balloon having a marbled appearance, balloon making compounds of different colors are dispensed from their package and molded together. In one method the molding step is accomplished by rolling a compound of one color into a ball and a compound of a second color into a thin thread. The threadlike second material is then wrapped around the ball of the first material and the resultant product placed on the end of a blow pipe and thereafter inflated. In a second method, predetermined proportions of compounds of several colors are packaged in a single tube, which when squeezed results in a striped dispensate and a multicolored balloon when inflated.

I claim:

1. A balloon making composition consisting essentially of 1–20% by weight of the composition of an opacifying compound selected from the group consisting of titanium dioxide, starch, calcium carbonate and mixtures thereof; 1–10% by weight of the composition of an elasticizing compound selected from the group consisting of rosin, cumarone and mixtures thereof; 1–20% by weight of the composition of texturizing compound selected from the group consisting of stearin and stearin fatty substances, mineral oil, vegetable oil, glycerin, propylene glycol and mixtures thereof; 10–25% by weight of the composition of a polyvinyl acetate solvent; and the balance by weight, but not more than approximately 70%, of the composition consisting essentially of polyvinyl acetate.

2. The composition of claim 1 wherein the polyvinyl acetate solvent is selected from the group consisting of methyl acetate, butyl acetate, acetone, ethanol and mixtures thereof.

3. The composition of claim 1 additionally containing 1–10% by weight of polyvinyl acetate coloring agent.

4. The composition of claim 1 wherein the opacifying compound is titanium dioxide, the elasticizing compound is rosin, the texturizing compound is a mixture of stearic acid, glycerin and mineral oil and the polyvinyl acetate solvent is acetone.

5. A balloon making composition comprising 56.57% by weight of polyvinyl acetate, 0.81% by weight of titanium dioxide, 6.52% by weight of rosin, 2.46% by weight of stearic acid, 1.61% by weight of glycerin, 10.0% by weight of mineral oil, 5.67% by weight of pigment and 16.36% by weight of acetone.

6. An airtight, hollow, deformable, non-tacky, substantially opaque and spheroid article consisting essentially of 1–20% by weight of the composition of an opacifying compound selected from the group consisting of titanium dioxide, starch, calcium carbonate and mixtures thereof; 1–10% by weight of the composition of an elasticizing compound selected from the group consisting of rosin, cumarone and mixtures thereof; 1–20% by weight of the composition of a texturizing compound selected from the group consisting of stearin and stearin fatty substances mineral oil, vegetable oil, glycerin, propylene glycol and mixtures thereof; a residue of polyvinyl acetate solvent and the balance by weight, but not more than approximately 70% of the composition consisting essentially of polyvinyl acetate.

7. The composition of claim 6 additionally containing 1–10% by weight of polyvinyl acetate coloring agent.

8. The composition of claim 6 wherein the opacifying compound is titanium dioxide, the elasticizing compound is rosin, the texturizing compound is a mixture of stearic acid, glycerin and mineral oil, and the polyvinyl acetate solvent residue is acetone.

9. A method of producing a balloon making composition comprising the steps of
(1) heating a mixture of 1–20% by weight of the composition of an opacifying compound selected from the group consisting of titanium dioxide, starch, calcium carbonate and mixtures thereof; 1–10% by weight of the composition of an elasticizing compound selected from the group consisting of rosin, cumarone and mixtures thereof; 1–20% by weight of the composition of a texturizing compound selected from the group consisting of stearin and stearin fatty substances, mineral oil, vegetable oil, glycerin, propylene glycol and mixtures thereof, to cause said mixture to liquify;
(2) mixing therewith 1–10% by weight of the composition of a polyvinyl acetate coloring agent in 10–25% by weight of the composition of a polyvinyl acetate solvent;
(3) mixing thoroughly therewith an amount of polyvinyl acetate to make substantially 100% by weight of the composition while applying sufficient heat to maintain a liquid mass.

10. The method of claim 9 wherein the opacifying compound is titanium dioxide, the elasticizing compound is rosin, the texturizing compound is a mixture of stearic acid, glycerin and mineral oil, and the polyvinyl acetate solvent is acetone.

References Cited
UNITED STATES PATENTS

| | | | |
|---|---|---|---|
| 2,413,239 | 12/1946 | Manson | 99—135 |
| 2,438,854 | 3/1948 | Jakobsen | 260—32.8 X |
| 3,061,572 | 10/1962 | Packer | 260—31.4 |

WILLIAM H. SHORT, Primary Examiner

E. WOODBERRY, Assistant Examiner

U.S. Cl. X.R.

260—17.4 ST, 27 R, 41 R

UNITED STATES PATENT OFFICE

CERTIFICATE OF CORRECTION

Patent No. 3,766,108     Dated October 16, 1973

Inventor(s) Shieu Shin Liwa

It is certified that error appears in the above-identified patent and that said Letters Patent are hereby corrected as shown below:

Col. 1, line 19, after "opacifying" insert --and--;

line 39, change "product" to --produce--;

Col. 2, line 41, change "pacification" to --opacification--;

line 45, after "oil" change ";" to --,--;

Col. 4, line 32, change "81" to --.81--;

line 53, change "is" (first occurrence) to --it--.

Signed and sealed this 24th day of September 1974.

(SEAL)
Attest:

McCOY M. GIBSON JR.
Attesting Officer

C. MARSHALL DANN
Commissioner of Patents